United States Patent
Platek et al.

(10) Patent No.: US 11,824,330 B2
(45) Date of Patent: Nov. 21, 2023

(54) INSULATOR FOR A MEDIUM- OR HIGH-VOLTAGE GAS-INSULATED SWITCHGEAR

(71) Applicant: HITACHI ENERGY LTD, Zürich (CH)

(72) Inventors: Robert Platek, Lesser (PL); Dariusz Bednarowski, Cracow (PL); Alberto Zanetti, Zürich (CH); Pierre Elser, Zürich (CH); Lukasz Malinowski, Cracow (PL)

(73) Assignee: Hitachi Energy Ltd, Zürich (CH)

( * ) Notice: Subject to any disclaimer, the term of this patent is extended or adjusted under 35 U.S.C. 154(b) by 177 days.

(21) Appl. No.: 17/296,286

(22) PCT Filed: Nov. 27, 2019

(86) PCT No.: PCT/EP2019/082755
§ 371 (c)(1),
(2) Date: May 24, 2021

(87) PCT Pub. No.: WO2020/109392
PCT Pub. Date: Jun. 4, 2020

(65) Prior Publication Data
US 2022/0102947 A1     Mar. 31, 2022

(30) Foreign Application Priority Data
Nov. 27, 2018  (EP) .................................. 18208583

(51) Int. Cl.
*H02B 13/045*  (2006.01)
*H02G 5/06*  (2006.01)
*H01B 19/00*  (2006.01)

(52) U.S. Cl.
CPC .......... *H02B 13/045* (2013.01); *H01B 19/00* (2013.01); *H02G 5/066* (2013.01)

(58) Field of Classification Search
CPC ....... H02B 13/045; H02G 5/066; H02G 5/068
See application file for complete search history.

(56) References Cited

U.S. PATENT DOCUMENTS 3,906,149 A * 9/1975 Hashoff ................. H02G 5/068
                                                 174/176
4,100,367 A * 7/1978 Netzel .................. H01B 9/0672
                                                 174/111

(Continued)

FOREIGN PATENT DOCUMENTS

| CN | 1340892 A | 2/2002 |
| CN | 101529679 A | 9/2009 |

(Continued)

OTHER PUBLICATIONS

First Office Action, Chinese Patent Application No. 201980076381.2, dated May 23, 2022, 4 pages.

(Continued)

*Primary Examiner* — Robert J Hoffberg
(74) *Attorney, Agent, or Firm* — Sage Patent Group (57) ABSTRACT

An insulator for a gas-insulated device is provided, including an injection-molded insulator disc and a conductor, wherein the insulator disc includes a first circumferential surface, a second circumferential surface disposed radially outwards from the first circumferential surface, and a web portion connecting the first circumferential surface and the second circumferential surface, characterized in that the web portion includes a wave structure, the web portion having an inner wave profile at the first circumferential surface and an outer wave profile at the second circumferential surface, and the inner wave profile and the outer wave profile have a radius of curvature of 2 mm or more and 10,000 mm or less.

14 Claims, 5 Drawing Sheets

(56) References Cited

U.S. PATENT DOCUMENTS

| | | | |
|---|---|---|---|
| 4,122,298 A | 10/1978 | Brandt | |
| 4,263,476 A * | 4/1981 | Netzel | H01B 9/0672 174/156 |
| 4,415,762 A * | 11/1983 | Ponder | H02G 5/066 174/99 B |
| 2014/0174787 A1 | 6/2014 | Zant et al. | |

FOREIGN PATENT DOCUMENTS

| | | | | |
|---|---|---|---|---|
| CN | 101855804 A | 10/2010 | | |
| CN | 101958516 A | 1/2011 | | |
| CN | 201708405 U | 1/2011 | | |
| CN | 103765710 A | 4/2014 | | |
| CN | 103765711 A | 4/2014 | | |
| CN | 104081606 A | 10/2014 | | |
| DE | 2815590 A1 * | 10/1979 | | H02G 5/068 |
| DE | 102013211133 A1 | 5/2016 | | |
| EP | 3 093 938 A1 | 11/2016 | | |
| JP | S58 31723 U | 3/1983 | | |
| JP | S59 85526 U | 6/1984 | | |
| JP | H06153342 A | 5/1994 | | |
| JP | 2004-335390 A | 11/2004 | | |
| WO | WO 2013/030387 A1 | 3/2013 | | |
| WO | WO-2013030386 A1 * | 3/2013 | | B29C 45/561 |
| WO | WO-2013030388 A1 * | 3/2013 | | H02G 5/066 |
| WO | WO-2013030389 A1 * | 3/2013 | | H02G 5/066 |

OTHER PUBLICATIONS

Decision to Grant, Japanese Patent Application No. 2021-529808, dated Oct. 18, 2022, 6 pages.

International Search Report and Written Opinion of the International Searching Authority, PCT/EP2019/082755, dated Feb. 14, 2020, 15 pages.

European Search Report, EP18208583.7, dated May 9, 2019, 8 pages.

* cited by examiner

INSULATOR FOR A MEDIUM- OR HIGH-VOLTAGE GAS-INSULATED SWITCHGEAR

CROSS REFERENCE TO RELATED APPLICATIONS

This application is a 35 U.S.C. § 371 national stage application of PCT International Application No. PCT/EP2019/082755 filed on Nov. 27, 2019, which in turns claims foreign priority to European Patent Application No. 18208583.7, filed on Nov. 27, 2018, the disclosures and content of which are incorporated by reference herein in their entirety.

FIELD OF THE DISCLOSURE

Embodiments of the present disclosure generally relate to an insulator for a gas-insulated device, particularly a gas-insulated switchgear. In particular, embodiments of the present disclosure relate to an insulator having a web portion comprising a complex wave structure. More particularly, embodiments of the present disclosure relate to a method of production of an insulator according to the above aspects, and the use of an insulator according to the above aspects in a medium-voltage or high-voltage gas-insulated switchgear.

TECHNICAL BACKGROUND

A gas-insulated switchgear, or GIS, accommodates medium-voltage or high-voltage conductors such as lead conductors to which a medium or high voltage is applied. In order to shield and insulate the conductor from other components and from the outside of the switchgear, such an apparatus comprises a grounded metal enclosure filled with an insulating gas, generally a dielectric gas such as SF6.

In order to hold a medium-voltage or high-voltage conductor firmly inside the device volume, in a position sufficiently far away from the grounded enclosure so as to avoid dielectric breakdowns, an insulator is provided inside the GIS enclosure. The insulator is secured at its outer edge to the enclosure, and has a central opening for accommodating the conductor. The main portion of the insulator is an insulator disc, with the central opening provided at its center. Some insulators may have an outer portion, including a metal armature ring attached to the outer circumference of the insulator disc. The armature ring may have attachment means, such as threaded holes, which allow the insulator to be firmly attached to the GIS enclosure.

Historically, for the manufacture of insulators for GIS alumina-filled epoxy has been used as a basic material due to good electrical insulating properties and mechanical strength. High-tech engineering thermoplastics exhibit good electrical insulation properties, but due to the injection molding process used in the manufacture of the insulator, the achievable wall thickness is limited in the range of several millimeters. Therefore, while the electrical insulation requirements are achieved by high-tech engineering thermoplastics, achieving the mechanical properties becomes challenging, as barrier insulators are required to withstand a high burst pressure.

US 2014/0174787 A1 was filed in the name of ABB Research Ltd. and published in June 2014, disclosing various designs for GIS insulators. Several designs disclosed therein employ structural features such as ribs or other reinforcement in order to increase stiffness 10 and durability. However, one drawback of the designs incorporating rib features concerns the cleaning of the insulator, which is an important process to be performed particularly during servicing of the switchgear. The insulators with rib features proved to be difficult to clean due to the small crevices between the ribs. Another proposed design incorporated a triangular wave-like cross section without rib features. This design offers the advantage of being easily 15 cleaned during assembly and servicing of the switchgear.

However, in order to meet the mechanical performance required for high-voltage applications, designers were required to either increase the wall thickness of the insulator or increase the number of repeated sections in the triangular wave-like cross section. It was found that due to the limited wall thickness achievable in the injection molding process, sufficiently increasing the wall thickness was not possible. Further, due to the sharp edges formed in the triangular wave-like cross section, it was found that high burst pressures would cause the insulator to fail in the regions of high stress concentration, i.e. at the peaks and troughs of the triangular wave-like cross section, resulting in inadequate mechanical performance. Further, a higher electrical field strength was exhibited along the sharp straight edges of the triangular wave-like cross section, resulting in inadequate electrical performance Additionally, it was found that increasing the number of waves in the triangular wave-like cross section was also limited, as a high number of waves with closer spacing increased the difficulty of cleaning in a similar way as the designs with rib features, particularly near the inner bead of the insulator.

Therefore, there is a need for solving the technical problems of achieving sufficient mechanical performance of the insulator for high-voltage applications, while also facilitating easy cleaning of the insulator in assembly and servicing of the switchgear. In view thereof, it is desired to overcome at least some of the problems in the prior art.

SUMMARY OF THE DISCLOSURE

An aspect of the present disclosure provides an insulator for a gas 5 insulated device. The insulator comprises an injection-molded insulator disc and a conductor, wherein the insulator disc comprises a first circumferential surface, a second circumferential surface disposed radially outwards from the first circumferential surface, and a web portion connecting the first circumferential surface and the second circumferential surface, 10 characterized in that the web portion comprises a wave structure, the web portion having an inner wave profile at the first circumferential surface and an outer wave profile at the second circumferential surface, wherein the inner wave profile and the outer wave profile have a radius of curvature of 2 mm or more and 10,000 mm or less.

A further aspect of the present disclosure provides a gas-insulated switchgear configured for medium-voltage or high-voltage, comprising at least one insulator according to the aspect above.

Yet a further aspect of the present disclosure provides a use of the insulator according to the above aspect in a medium-voltage or high-voltage switchgear.

The embodiments described in the present disclosure allow for improved mechanical performance of the web portion of the insulator. Further, the web portion of the insulator, which comprises a wave structure, facilitates easy cleaning of the insulator.

Further advantages, features, aspects and details that can be combined with embodiments described herein are evident from the dependent claims, claim combinations, the description and the drawings.

BRIEF DESCRIPTION OF THE FIGURES

The details will be described in the following with reference to the figures, wherein.

DETAILED DESCRIPTION OF THE FIGURES AND OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can be applied to a corresponding part or aspect in another embodiment as well.

Figure 1:
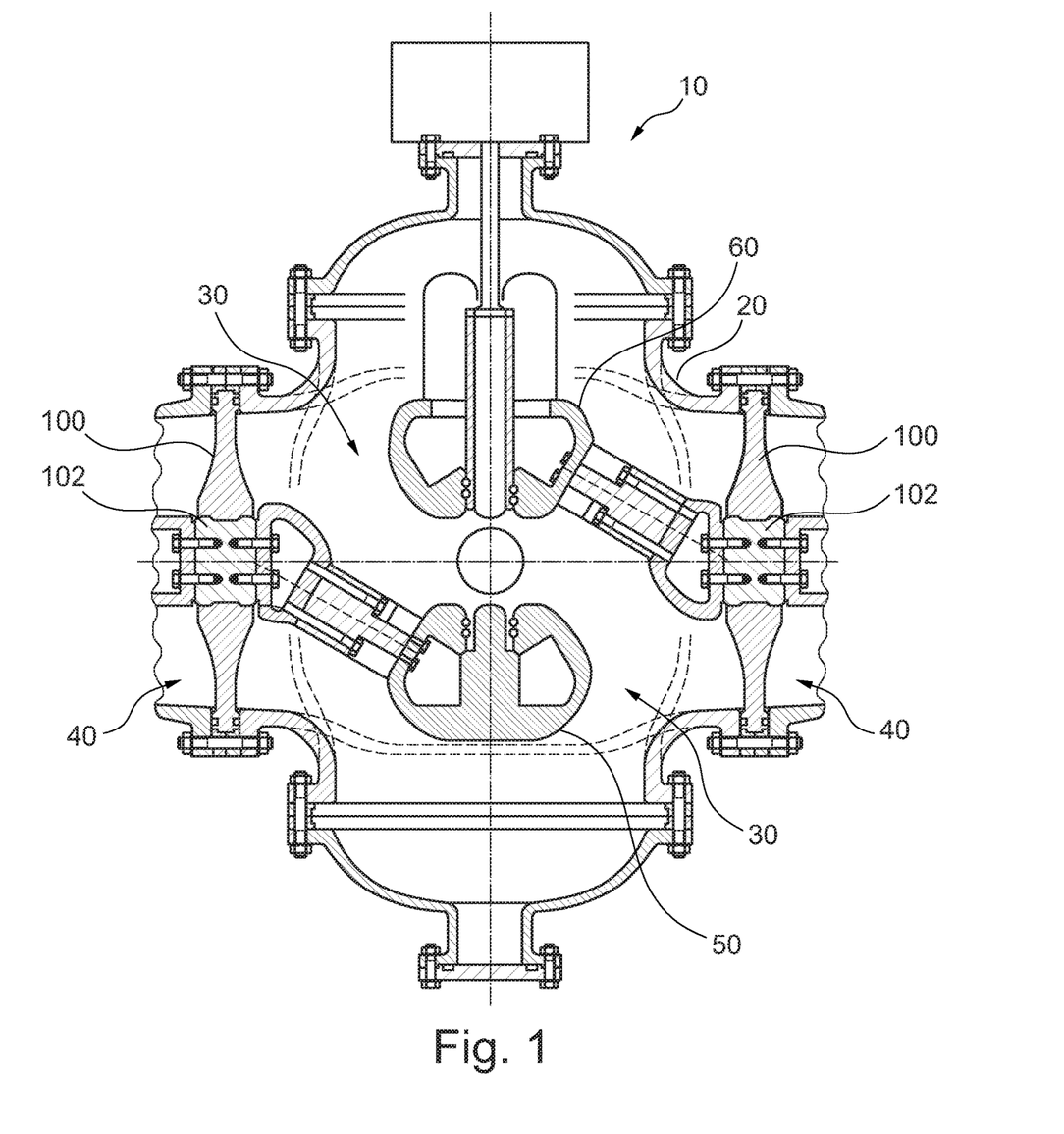
FIG. 1 is a schematic cross-sectional view of a gas-insulated switchgear according to an embodiment of the disclosure.

FIG. 1 exemplarily shows a cross-sectional view of a gas-insulated switchgear 10 according to an embodiment of the present disclosure. The gas-insulated switchgear 10 includes at least one insulator 100 according to any embodiments described herein. The gas-insulated switchgear 10 may be configured for medium- or high-voltage. In the context of the present disclosure, the term "medium-voltage" may refer to a voltage of at least 1 kV and up to 52 kV. Further, the term "high-voltage" in the context of the present disclosure may refer to a voltage of at least 52 kV.

The gas-insulated switchgear 10 includes an enclosure 20. Enclosure 20 may, for example, enclose a first region 30 and at least a second region 40. The first region 30 and second region 40 may be separated by insulator 100. At least one of first region 30 and second region 40 may comprise an insulating gas, for example SF6. Gas-insulated switchgear 10 further includes a first electrode assembly 50 and a second electrode assembly 60. First electrode assembly 50 may be fastened to the conductor 102 of a first insulator 100 and second electrode assembly 60 may be fastened to the conductor 102 of a second insulator 100.

Figure 2:
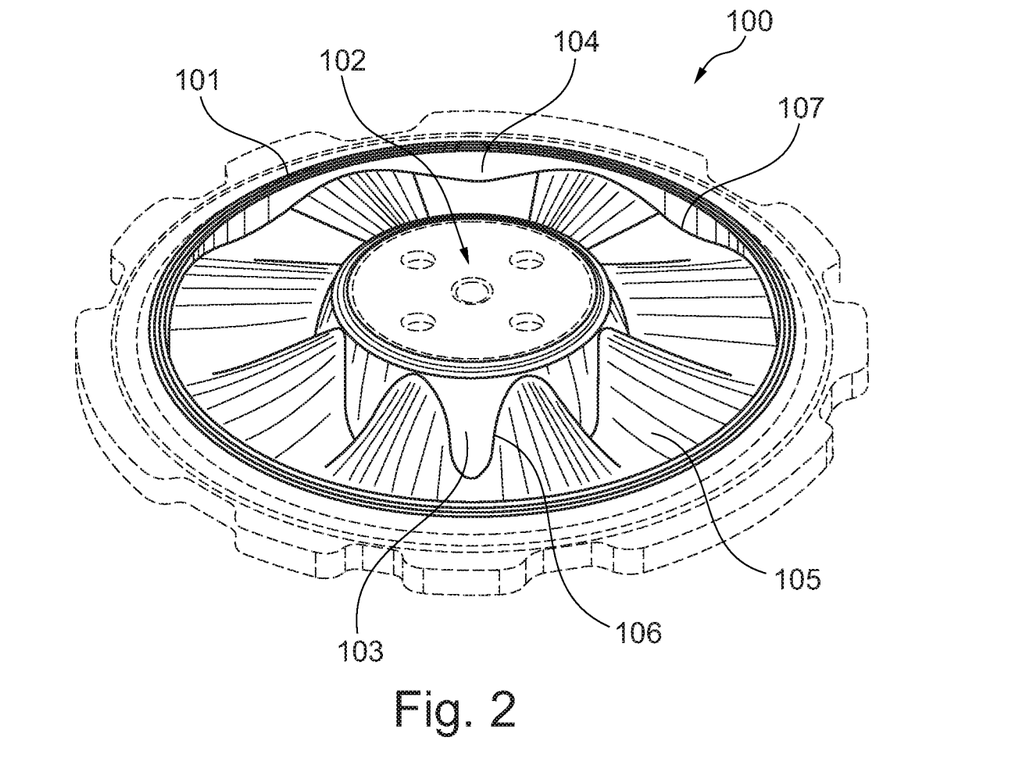
FIG. 2 is a perspective view of an insulator according to an embodiment of the disclosure.

Referring now to FIG. 2, an aspect of the present disclosure provides an insulator 100 for a gas-insulated device 10. The insulator 100 includes an injection-molded insulator disc 101 and a conductor 102. Insulator disc 101 may include an inner portion and an outer portion, whereby the inner portion includes a central opening and the outer portion includes an interfacing portion for sealing against enclosure 20 of gas-insulated device 10. Conductor 102 is positioned in the central opening of the insulator disc 102 such that conductor 102 is spaced with sufficient distance to enclosure 20 of the gas-insulated device 10 so as to avoid dielectric breakdowns between conductor 102 and enclosure 20.

Insulator disc 101 may include an inner portion, an outer portion and a web portion connecting the inner portion and the outer portion. For example, insulator disc 101 may have a disc-shaped structure. The inner portion of insulator disc 101 is configured for supporting a conductor, while outer portion of insulator disc 101 is configured for sealing against an inner wall of an enclosure of a gas-insulated device.

Insulator disc 101 includes a first circumferential surface 103 and a second circumferential surface 104. In the context of the present disclosure, the term "circumferential surface" may include any surface constructed by revolving a profile about an axis of rotation. The profile may typically be revolved in a full rotation, however the term "circumferential surface" is not limited thereto and may also include a partial rotation. A "circumferential surface" may have a surface normal direction which is substantially in the radial direction, such as a cylindrical or substantially cylindrical surface, however the term "circumferential surface" is not limited thereto and may include surfaces with a surface normal direction in a substantially axial direction, or at an angle between the axial and radial directions, such as a conical surface.

Second circumferential surface 104 is disposed radially outwards from the first circumferential surface 103. Particularly, first circumferential surface 103 may be disposed on a radially inner side of insulator disc 101, and second circumferential surface 104 may be disposed on a radially outer side of insulator disc 101. For example, first circumferential surface 103 and second circumferential surface 104 may be arranged such that they are concentric to one another, however the present disclosure is not limited thereto. For example, first circumferential surface 103 and second circumferential surface 104 may be eccentric to one another. First circumferential surface 103 and second circumferential surface 104 may substantially align with one another in the axial direction such that a line connecting first circumferential surface 103 and second circumferential surface 104 may be aligned in the radial direction. Alternatively, first circumferential surface 103 and second circumferential surface 104 may be offset from one another in the axial direction, such that a line connecting first circumferential surface 103 and second circumferential surface 104 is at an angle with respect to the radial direction.

Insulator disc 101 further includes a web portion 105 connecting first circumferential surface 103 and second circumferential surface 104. Web portion 105 forms the insulating barrier between a region on one side of the insulator 100 and a region on the other side of the insulator 100. Web portion 105 includes a wave structure, and has an inner wave profile 106 at first circumferential surface 103 and an outer wave profile 107 at second circumferential surface 104. In the context of the present disclosure, the term "wave profile" refers to a profile that lies on either one of first circumferential surface 103 and second circumferential surface 104, wherein the profile defines a shape of web portion 105 at the join between web portion 105 and first circumferential surface 103 or second circumferential surface 104, respectively. A surface may be constructed which connects inner wave profile 106 and outer wave profile 107 such that said surface forms a complex wave surface. The complex wave surface may then be thickened to form web portion 105 having a wave structure. It follows that web portion 105 may have an upper surface and a lower surface. In the context of the present disclosure, the complex wave surface is thickened an equal amount on each respective side, such that the complex wave surface lies at a neutral position halfway between the upper surface of the web portion 105 and the lower surface of the web portion 105. However, the present disclosure is not limiting thereto. For example, the complex wave surface may be thickened only on one side, or may be thickened more on one side than the other side. Further, it follows that the upper surface and the lower surface of web portion 105 have mutually aligned wave structures, wherein the a peak on the upper surface is aligned with a respective trough on the lower surface.

In the context of the present disclosure, the term "radius of curvature" refers to the mathematical concept of extrinsic curvature of a smooth curve. The radius of curvature at a specific point of a smooth curve is defined as the radius of its osculating circle at that specific point along the smooth curve. It follows that a curve which is a straight line or straight line segment has an infinite radius of curvature, as the osculating circle at a point along a straight line or straight line segment has infinite radius. Conversely, a curve which has a sharp right-angle corner having a radius of the osculating circle at the point of the sharp right-angle corner approaching zero would have a radius of curvature approaching zero. In the present disclosure, the units for radius of curvature will be specified in mm.

Inner wave profile 106 and outer wave profile 107 may have a radius of curvature of 10,000 mm or less. In other words, inner wave profile 106 and outer wave profile 107 may be constructed such that no portion of inner wave profile 106 and outer wave profile 107 comprise a straight segment. Particularly, inner wave profile 106 and outer wave profile 107 may have a radius of curvature of 2,000 mm or less, more particularly 1,000 mm or less. It follows that, after the complex wave surface constructed between inner wave profile 106 and outer wave profile 107 has been thickened to form web portion 105, the resulting web portion 105 comprises no portions where its surfaces are flat or substantially planar. When a distributed surface pressure is applied to the surface of web portion 105, for example a burst pressure, a resulting load applied to web portion 105 in one direction over a significant surface area is avoided. Furthermore, the mechanical strength of web portion 105 when a distributed surface pressure is applied thereto is increased due to the curvature of web portion 105.

Inner wave profile 106 and outer wave profile 107 may have a radius of curvature of 2 mm or more. In other words, inner wave profile 106 and outer wave profile 107 may be constructed such that no portion of inner wave profile 106 and outer wave profile 107 comprise a segment having a radius of curvature of less than 2 mm Particularly, inner wave profile 106 and outer wave profile 107 may have a radius of curvature of 5 mm or more, more particularly 10 mm or more. In particular, after the complex wave surface constructed between inner wave profile 106 and outer wave profile 107 has been thickened to form web portion 105, the resulting web portion 105 comprises no portions where one of its surfaces has a sharp edge having a radius of zero. In other words, inner wave profile 106 and outer wave profile 107 may be continuous smooth curves. More particularly, where the complex wave surface has been thickened equally on each side thereof to form web portion 105, inner wave profile 106 and outer wave profile 107 may have a radius of curvature of at least half of the thickness of web portion 105. A sharp edge having a very small radius forms a region of high stress concentration and high electrical field strength. It follows that, when the surfaces of web portion 105 comprise no sharp edges, regions of high stress concentration may be avoided, thereby increasing the mechanical strength of web portion 105 when a distributed pressure is applied thereto, and regions of high electrical field strength may be avoided, thereby improving the electrical performance of the insulator.

As stated previously, inner wave profile 106 and outer wave profile 107 are wave profiles that lie on first circumferential surface 103 and second circumferential surface 104, respectively. Therefore, inner wave profile 106 and outer wave profile 107 may be thought of as circumferential wave profiles. Therefore, any reference to a radius of curvature with respect to inner wave profile 106 and outer wave profile 107 is to be thought of as a radius of curvature of the curve in the circumferential direction.

In the context of the present disclosure, the term "having a radius of curvature" means that the radius of curvature is within the stated limits not just at a single location on a respective wave profile, but at every location along the respective wave profile. In other words, for a respective wave profile, at no point along the entire wave profile is the radius of curvature of the respective wave profile below the stated lower limit or above the stated upper limit.

According to an embodiment, which may be combined with other embodiments described herein, web portion 105 may have a circumferential radius of curvature of 2 mm or more and 10,000 mm or less. Particularly, the complex wave surface formed between inner wave profile 106 and outer wave profile 107 which is thickened to form web portion 105 may have a circumferential radius of curvature 2 mm or more and 10,000 mm or less. More particularly, where the complex wave surface has been thickened equally on each side thereof to form web portion 105, the complex wave surface may have a circumferential radius of curvature of at least half of the thickness of web portion 105. Even more particularly, web portion 105 may have a circumferential radius of curvature on the upper surface and/or the lower surface of the web portion 105 of more than 0 mm and at most 10,000 mm Particularly, web portion 105 may have a circumferential radius of curvature on the upper surface and/or the lower surface of web portion 105 of at most 2,000 mm, more particularly at most 1,000 mm. As a three-dimensional structure, web portion 105 may have a radius of curvature in the circumferential direction and/or the radial direction. In the circumferential direction, web portion 105 may have a radius of curvature in the circumferential direction similarly to that of inner wave profile 106 and outer wave profile 107, in that web portion 105 comprises no portions where the upper surface and/or lower surface of web portion 105 has a sharp edge having a radius of curvature of zero.

Web portion 105 may have a radial radius of curvature in the radial direction. For example, web portion 105 may have a radial radius of curvature such that web portion 105 forms a bowl-like wave structure whereby any radial curve connecting first circumferential surface 103 and second circumferential surface 104 is curved. Alternatively, web portion 105 may have an infinite radial radius of curvature such that web portion 105 forms a wave structure whereby any radial curve connecting first circumferential surface 103 and second circumferential surface 104 is a straight line.

Web portion 105 may have a thickness in the direction perpendicular to a surface of web portion 105. Particularly, according to an embodiment which may be combined with other embodiments described herein, the thickness of wave portion 105 may be substantially constant in the direction perpendicular to a surface of web portion 105. The term "substantially constant" may refer to a thickness which remains within a ±10% tolerance between the thickest portion of web portion 105 and the thinnest portion of web portion 105. For example, web portion 105 may have a substantially constant thickness of 4 mm±0.4 mm Particularly, the term "substantially constant" may refer to a thickness which remains with a ±5% tolerance between the thickest portion of web portion 105 and the thinnest portion of web portion 105. For example, web portion 105 may have a substantially constant thickness of 4 mm±0.2 mm. Alternatively, the thickness of web portion 105 may vary across web portion 105. For example, web portion 105 may have a lower thickness in an inner region near first circumferential surface 103 and a higher thickness in an outer region near second circumferential surface 103. For example, web portion 105 may have an inner thickness at inner circumferential surface 103 of 3 mm and an outer thickness at second circumferential surface 104 of 6 mm, wherein the thickness increases in the radial outward direction. As a further example, web portion 105 may have a higher thickness in an inner region near first circumferential surface 103 and a lower thickness in an outer region near second circumferential surface 103. For example, web portion 105 may have an inner thickness at inner circumferential surface 103 of 6 mm and an outer thickness at second circumferential surface 104 of 3 mm, wherein the thickness decreases in the radial outward direction.

The thickness of web portion 105 may be limited by one of the injection molding process for producing insulator disc 101 or the material used to produce insulator disc 101. Particularly, the thickness of web portion 105 may be at most 20 mm More particularly, the thickness of web portion 105 may be in a range from 2 mm to 20 mm.

As compared to a simple flat disc portion having the same thickness as wave portion 105, wave portion 105 includes a higher amount of material and therefore exhibits higher mechanical strength. Due to the wave structure of wave portion 105, the insulator 100 is able to withstand a considerably higher pressure exerted by the insulating gas, for example, during a burst incident. Further, since web portion 105 exhibits higher strength and stiffness performance compared to a simple flat disc having the same thickness, improved mechanical performance of the insulator can be achieved without increasing the thickness of the web portion 105. Therefore, the insulator disc 101 can be injection molded using high-tech thermoplastic materials without encountering limitations based on the thickness of the injection molded part.

Further, as compared to a disc portion having rib features with small crevices in between each rib feature, wave portion 105 includes no small crevices which would hinder the ease of cleaning the insulator 100. Therefore the ease of cleaning insulator 100 is improved.

Figure 3:
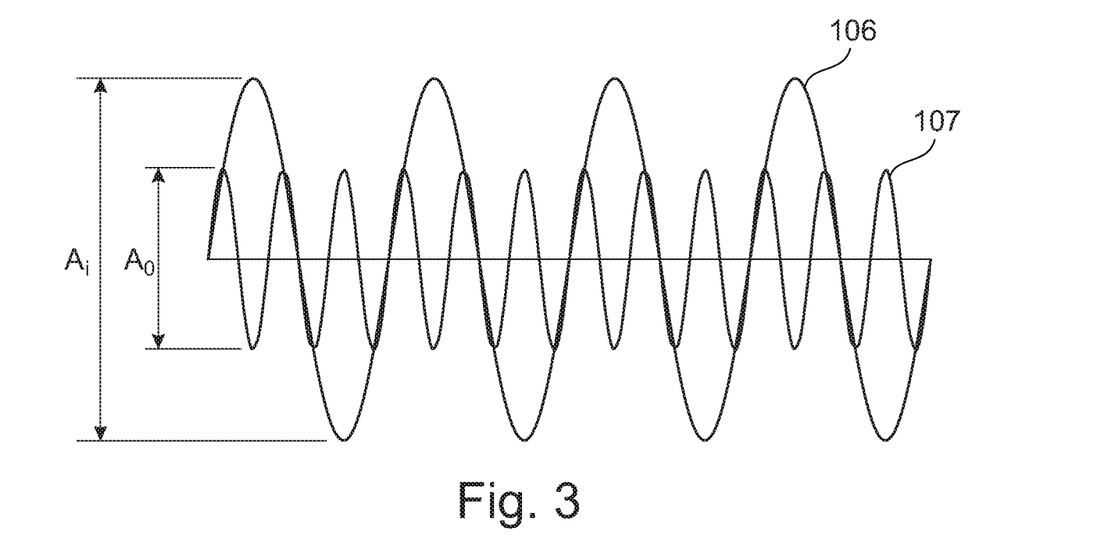
FIG. 3 is a representation of the inner wave profile and the outer wave profile of an insulator according to an embodiment of the disclosure.

Referring now to FIG. 3, inner wave profile 106 and outer wave profile 107 may be represented by a repeating curve having an amplitude substantially aligned in the axial direction of insulator 100 and extending in the radial direction. FIG. 3 shows amplitude with respect to radial position θ of inner wave profile 106 and outer wave profile 107. As exemplarily shown in FIG. 3, inner wave profile 106 and outer wave profile 107 include one full rotation of the insulator 100. Inner wave profile 106 and outer wave profile 107 are represented as sine waves, however the present disclosure is not limited thereto. Inner wave profile 106 and/or outer wave profile 107 may include any repeating wave-like profile, including a triangle wave, a quadrature trapezoidal wave, a wave comprising arc segments, or a sine wave.

Inner wave profile 106 and outer wave profile 107 each have an amplitude. In the context of the present disclosure, an "amplitude" of a wave profile refers to the height in the axial direction of the wave profile between a peak of the wave profile and a trough of the wave profile. As exemplarily shown in FIG. 3, inner wave profile 106 has a first amplitude $A_i$ and outer wave profile 107 has a second amplitude $A_o$. First amplitude $A_i$ and second amplitude $A_o$ may be non-equal.

According to an embodiment, which may be combined with other embodiments described herein, outer wave profile 107 has a second amplitude $A_o$ which is less than first amplitude $A_i$ of inner wave profile 106. In this case, by having an increased first amplitude $A_i$ the wave portion 105 may be provided with sufficient mechanical strength and stiffness at an inner portion near first circumferential surface 103 where the first number of cycles $n_i$ is limited. At the same time, wave portion 105 may instead be provided with a higher second number of cycles $n_o$ at a lower second amplitude $A_o$ in order to achieve similar levels of mechanical strength and stiffness as the outer portion near second circumferential surface 104.

Inner wave profile 106 and outer wave profile 107 each have a number of midpoints. In the context of the present disclosure, a "midpoint" of a wave profile refers to a point at which the wave profile crosses a neutral plane of the wave profile. For example, a "midpoint" may refer to a point of inflection of a sine wave.

Inner wave profile 106 and outer wave profile 107 each include a number of cycles $n_i$, $n_o$. Inner wave profile 106 has a first number of cycles $n_i$. Respectively, outer wave profile 107 has a second number of cycles $n_o$. In the context of the present disclosure, a "number of cycles" refers to the number of repeating units of a wave profile in one full rotation of the wave profile. As such, the number of cycles $n_i$, $n_o$ corresponds to the number of peaks of the respective wave profile, or to the number of troughs of the respective wave profile. As exemplarily shown in FIG. 3, inner wave profile 106 has first number of cycles $n_i=4$ and outer wave profile 107 has second number of cycles $n_o=12$. It follows that inner wave profile 106 includes 4 peaks and 4 troughs, and outer wave profile includes 12 peaks and 12 troughs. The first number of cycles $n_i$ and the second number of cycles $n_o$ may be different. That is, the inner wave profile 106 may have a different number of cycles to that of the outer wave profile 107.

The number of cycles $n_i$, $n_o$ is a factor in determining the mechanical strength and stiffness of the insulator 100. A higher number of cycles $n_i$, $n_o$ leads to an increase in material in web portion 105, and hence increases the strength and stiffness. However, the number of cycles $n_i$, $n_o$ is also limited by the ease at which the insulator 100 can be cleaned. A higher number of cycles $n_i$, $n_o$ leads to adjacent waves being spaced closer together, and may form narrow crevices between adjacent waves which hinder the ease of cleaning. Due to the smaller diameter at the first circumferential surface 103 compared to the second circumferential surface 104, the number of cycles $n_i$, $n_o$ is more limited for the inner wave profile 106 than the outer wave profile 107. For example, inner wave profile 106 may have a first number of cycles of $4 \leq n_i \leq 10$, while outer wave profile 107 may have a second number of cycles of $4 \leq n_o \leq 40$.

According to an embodiment, which may be combined with other embodiments described herein, the first number of cycles $n_i$ may be less than the second number of cycles $n_o$. In this case, the outer wave profile 107 may have a higher number of cycles such that the strength and stiffness of the wave portion 105 can be increased by increasing the amount of material at the outer portions of wave portion 105. At the same time, the inner wave profile 106 may have a lower number of cycles so that the peak portions of wave portion 105 are spaced with sufficient distance between them so as to facilitate easier cleaning of the insulator 100.

Figure 4A:
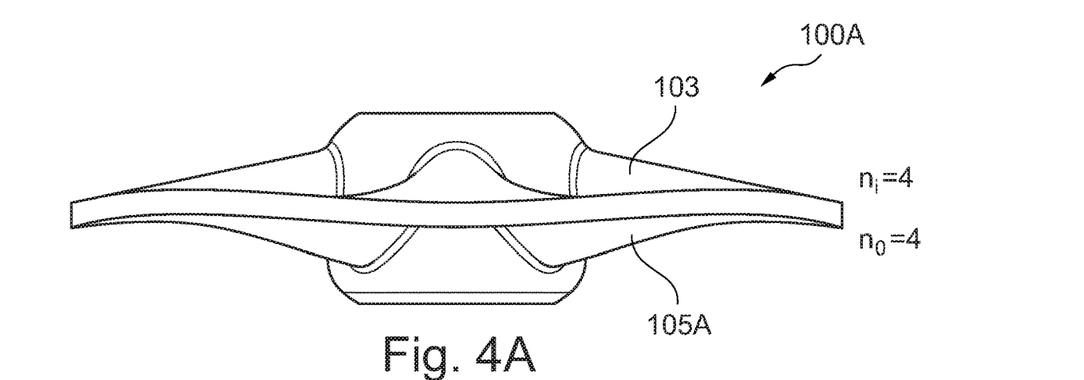
FIG. 4A-4C are schematic side views of three varying designs of an insulator, with the outer portion not shown, according to one or more embodiments of the disclosure.
Figure 4B:
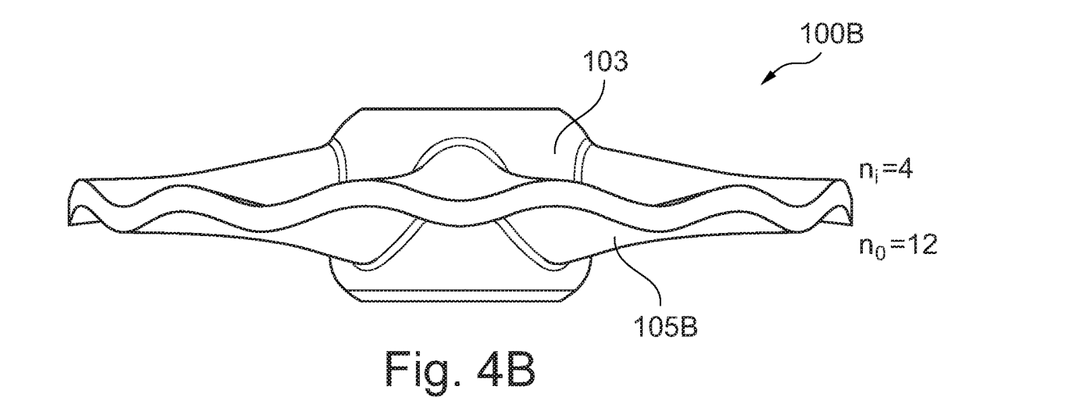
Figure 4C:
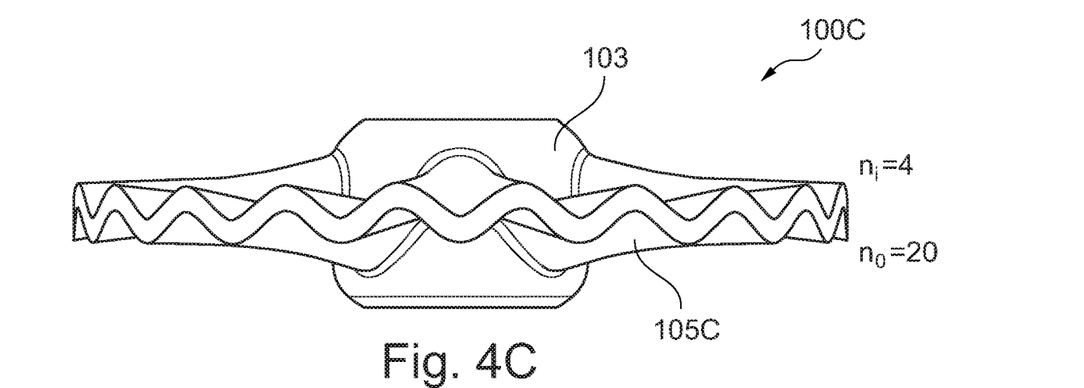

FIGS. 4A through 4C exemplarily show three varying designs of an insulator according to embodiments described herein. For clarity, the outer portion of insulators 100A, 100B, 100C has been hidden. All three example insulators 100A, 100B, 100C have the same first number of cycles $n_i=4$. That is, the web portions 105A, 105B, 105C have the same first wave profile having four peaks and four troughs, respectively. Further, all three example insulators 100A, 100B, 100C have the same first amplitude $A_i$ and the same second amplitude $A_o$.

The three designs of FIGS. 4A through 4C, however, each have a different second number of cycles $n_o$. As exemplarily shown in FIG. 4A, web portion 105A of insulator 100A has a second number of cycles $n_o=4$, web portion 105B of insulator 100B has a second number of cycles $n_o=12$ and web portion 105C of insulator 100C has a second number of cycles $n_o=20$. It can be seen that the amount of material in web portions 105B, 105C, which have second number of cycles $n_o=12$ and $n_o=20$, respectively, is higher than the amount of material in web portion 105A, which has second number of cycles $n_o=4$. By having a higher second number of cycles $n_o$ than first number of cycles $n_i$, the mechanical strength and stiffness of the web portions 105B, 105C of insulators 100B, 100C is improved as compared to the web portion 105A of insulator 100A.

According to an embodiment, which may be combined with other embodiments described herein, the second number of cycles $n_o$ may be an integer multiple of the first number of cycles $n_i$. For example, if the first number of cycles $n_i=4$, then the second number of cycles $n_o$ may be equal to, for example, 8, 12 or 20. This arrangement has the advantage of the web portion 105 having a repeatable, rotationally-symmetrical shape such that the mechanical properties around the circumference of web portion 105 is rotationally-symmetrical. For example, if web portion 105 did not exhibit rotational symmetry, a distributed pressure across the entire surface of web portion 105 could induce non-symmetric stresses in web portion 105. Setting the second number of cycles $n_o$ may be an integer multiple of the first number of cycles $n_i$ avoids such a non-symmetrical stress distribution.

Figure 5A:
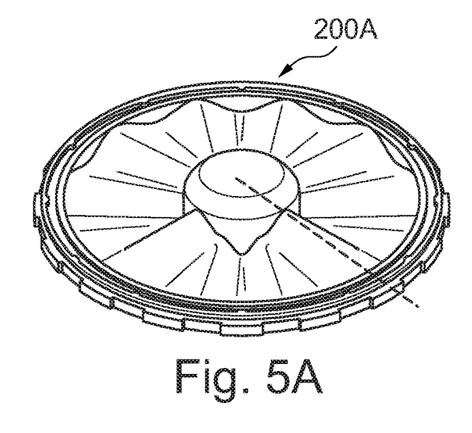
FIG. 5A-5B are perspective views of two varying designs of an insulator according to one or more embodiments of the disclosure.
Figure 5B:
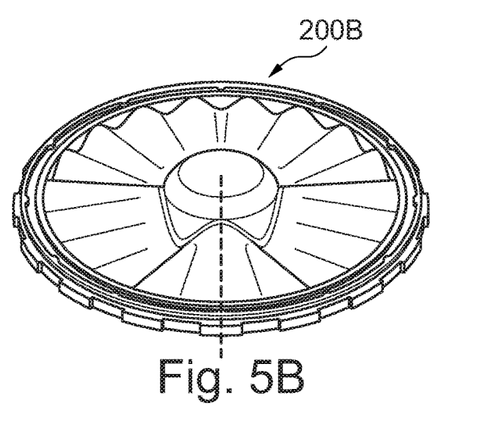
Figure 6A:
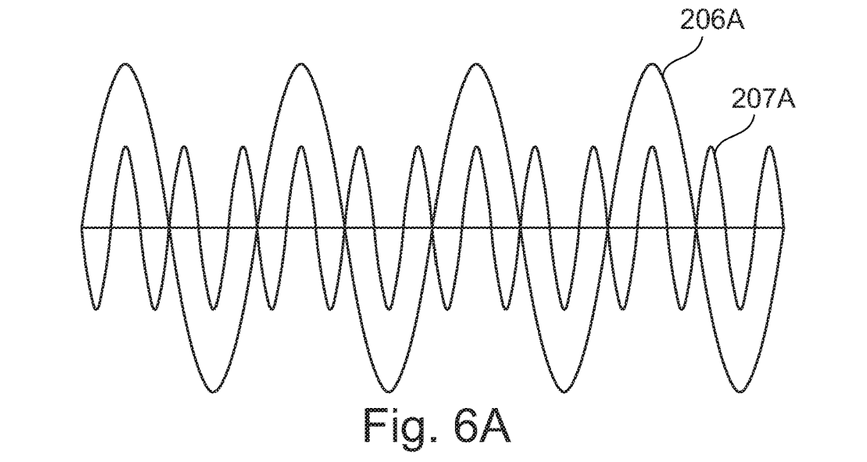
FIG. 6A-6B are representations of the inner wave profile and the outer wave profile of two varying designs of an insulator according to one or more embodiments of the disclosure.
Figure 6B:
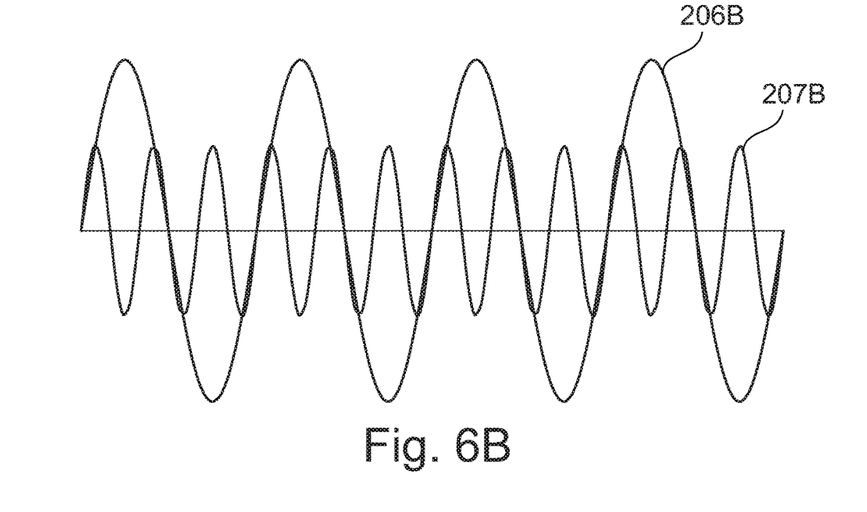

According to an embodiment, which may be combined with other embodiments described herein, each peak of the inner wave profile may be radially aligned with a respective peak of the outer wave profile, or a respective trough of the outer wave profile. FIGS. 5A and 5B show perspective views of two varying designs of insulator 200A, 200B. FIGS. 6A and 6B show representations of the corresponding inner wave profile 206A, 206B and outer wave profile 207A, 207B for insulators 200A, 200B. Both insulators 200A, 200B have a first number of cycles $n_i=4$ and a second number of cycles $n_o=12$. However, the insulators 200A, 200B differ in that for insulator 200A, each peak of inner wave profile 206A is radially aligned with a respective peak of outer wave profile 207A, while for insulator 200B, each peak of inner wave profile 206B is radially aligned with a respective trough of outer wave profile 207B.

Referring back to FIG. 1, insulator disc 101 includes a central opening in which the conductor 102 is arranged. The insulator disc 101 is injection molded onto the conductor 102. According to an embodiment, which may be combined with other embodiments described herein, the insulator disc 101 is directly injection molded on an outer surface of the conductor 102. Alternatively, or in addition, an intermediate layer may be arranged between the conductor 102 and the insulator disc 101. For example, the intermediate layer may be a primer. The conductor 102 may include teeth which are directly or indirectly engaged with the insulator disc for a form fit. An example of an indirect connection would be a conductor that is already coated with a field electrode, for example, prior to inserting said coated conductor into the cavity of the mold. The term 'teeth' shall not be understood as a jagged structure in a narrow sense since sharp edges shall be avoided for dielectric reasons. The term 'teeth' shall be rather understood in a broad sense as a representative term for any suitable locking means for establishing a form fit by a variation in diameter relative to the center axis of the insulator 100. That engaging means blocks the insulator disc 101 from being easily stripped from the conductor 102 in an axial direction, i.e. in the direction of the center axis of the insulator 100. Said locking means may include one single rounded tooth that is established by a bulge extending circumferentially and radially on the shell surface of the conductor. After injection molding of the insulator disc 101, said insulator disc 101 features in its center opening a shape being the negative to said bulge such that a good form fit in between the conductor 102 and the insulator disc 101 is achievable. Moreover, the locking means serves to increase an overall contact surface in between the conductor 102 and the insulator disc 101.

An inner surface of the central opening can at least partially be distanced by a gap from the conductor 102. A transition means may be arranged in the gap interconnecting the insulator disc 101 and the conductor 102. A holding means may be arranged inside the gap positioning the conductor 102 with respect to the insulator disc 101. The holding means may be at least one circumferential holding rib and/or at least one holding rib arranged in axial direction (axial holding rib). The holding means may be integrally connected to the insulator disc 101. The first material may be injected by at least one first distribution channel arranged within the conductor 102. The term 'first material' shall not be understood in a way that it consists of one single material such as PET, for example, but in that it may be a material composition.

Due to the nature of the injection molding process, the injection-molded insulator disc 101 may have a number of weld surfaces. When material is injected into a mold from multiple entry points, two or more material flows will meet and fuse along a weld surface. These weld surfaces may constitute surfaces between material flows which may be weaker than the surrounding material. The injection molding process may be configured to optimize the location of these weld lines. For example, the weld surfaces could be positioned and aligned in locations corresponding to lower stress under applied load. Alternatively, the number of injection points could be decreased so that fewer weld surfaces are formed, however the reduction of injection points may not be practical for injection molding insulator disc 101.

According to an embodiment, which may be combined with other embodiments described herein, insulator disc 101 may further include stiffeners. In the context of the present disclosure, the term "stiffener" refers to a portion of web portion 105 which may be thickened along a stiffener profile on which the stiffener is formed. For example, a radial stiffener may be formed in web portion 105 such that the stiffener profile extends from first circumferential surface 103 to second circumferential surface 104 in a radial direction, and the web portion 105 is thickened along this radial stiffener profile.

One advantage of forming stiffeners in web portion 105 is that the stiffeners may be formed such that their stiffener profiles follow one or more weld surfaces. Since the weld surfaces can introduce a weakness where the mechanical strength and stiffness of web portion 105 is reduced, a stiffener formed along these weld surfaces would locally increase the mechanical strength along the weakened weld surface. Further, the number of injection points can be increased so to improve distribution of material at the expense of producing more weld surfaces, while stiffeners located at the weld surfaces can strengthen the web portion 105 along the weld surfaces.

The stiffeners formed in web portion 105 may have a stiffener profile having a first end and a second end. The first end may correspond to an inner end which lies on the first circumferential surface 103. The second end may correspond to an outer end which lies on the second circumferential surface 104. Thus, a stiffener formed along as stiffener profile having an inner end and an outer end would connect first circumferential surface 103 and second circumferential surface 104. The inner end may lie at a midpoint of the inner wave profile 106, and the outer end may lie at a midpoint of the outer wave profile 107. The number of stiffeners formed in web portion 105 may correspond to the first number of cycles $n_i$, or may correspond to double the first number of cycles $n_i$.

According to an embodiment, which may be combined with other embodiments described herein, the insulator disc 101 comprises a thermoplastic. Preferably, the insulator disc 101 comprises one of the group containing thermoplastic urethanes (TPU), thermoplastic elastomers (TPE), epoxies or polyurethanes (PUR). However, the present disclosure is not limited just to this group of materials, i.e. the insulator disc 101 may comprise any one of the group containing polyesters (e.g. polyethylene terephthalate, polybutylene terephthalate), polyamide (PA), polysulfone (e.g. PES), polyetherimide (PEI), polyphenylene sulfide (PPS), polyether ether ketone (PEEK), polyphthalamide (PPA) or polypropylene (PP).

Insulator disc 101 may further comprise at least one filler material. The filler material may be one of the group containing polyamide, polyimide, polyester, polyvinyl alcohol, polyvinylidene chloride, polyacrylonitrile, polyurethane, polyalkylene paraoxybenzoate, phenol type, wool, silk, cotton, rayon, cellulose acetate, flax, ramie, jute, aramid fibres, glass, sepioliate, potassium titanate, ceramic, alumina, calcium silicate and rockwool.

Insulator disc 101 may further comprise a surface coating. The surface coating may be one of the group containing thermoplastic elastomers (TPE), thermoplastic polyurethanes (TPU), polyurethane (PUR or PU) or silicones.

According to an embodiment, which may be combined with other embodiments described herein, insulator disc 101 may further include at least one radiused edge between the web portion 105 and the first circumferential surface 103 and/or between the web portion 105 and the second circumferential surface 104. The joining edge at which web portion 105 meets either first circumferential surface 103 or second circumferential surface 104 may be formed at a sharp angle, wherein the edge introduces a stress concentrator at this joining edge. At least one of these joining edges may be provided with a radius such that the stress concentrator is alleviated, thereby improving mechanical strength and stiffness of insulator 100. Such a radiused edge has the further technical effect of improving the ease of cleaning insulator 100.

Figure 7:
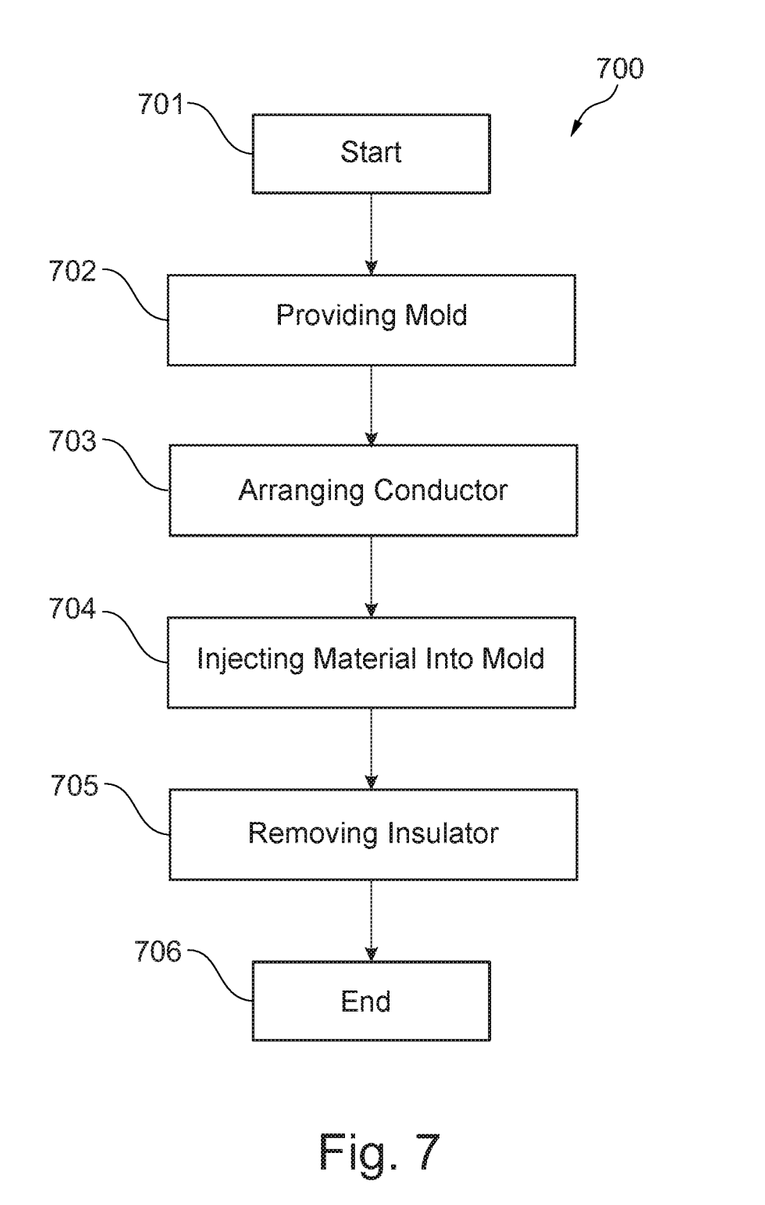
FIG. 7 is a flowchart of a method for the production of an insulator according to an embodiment of the disclosure.

FIG. 7 shows a flowchart of a method 700 for the production of an insulator according to an aspect of the present disclosure. The method 700 commences at block 701, and comprises providing a mold at block 702 for injection molding of an insulator disc, the insulator disc comprising an inner portion having a central opening; arranging a conductor in a cavity of the mold at block 703; injecting a material into the mold at block 704 to form the insulator disc such that the conductor is positioned inside the central opening and the inner portion and the conductor are directly or indirectly fastened together; and removing the insulator from the mold at block 705. Method 700 concludes at block 706.

In block 702, a mold for injection molding of an insulator disc is provided. The mold may comprise an upper mold and a lower mold which, when brought together, form a cavity in the shape of a negative of the insulator.

In block 703, a conductor is arranged in the cavity of the mold. The mold, or one of the upper mold and lower mold, may be designed such that the conductor may be directly arranged from the outside, i.e. the mold comprises an opening through which the cavity is accessible from the outside so that the conductor may be arranged inside of the mold prior to closing the opening. The mold may comprise an adapter to receive and temporarily hold the conductor during the injection molding process. The adapter may be designed exchangeable such that different conductors can be processed with the same mold. If appropriate the adapter can be part of the cavity of the mold thereby being at least partially in contact with the injection molded material. The conductor may be preheated to a defined temperature before injection of the first material.

In block 704, a material is injected into the mold. The material may be injected through at least one channel to form the insulator disc around the conductor, such that the insulator disc and the conductor are directly fastened together. Alternatively, the material may include more than one material injected in one or more separate steps. For example, a first material may be injected through at least one channel to form an interface element between the conductor and the insulator disc, while a second material may be injected through at least one other channel to form the insulator disc itself, whereby the conductor and the insulator disc are indirectly fastened together. The one or more materials may be injected through at least one channel arranged inside the conductor.

In block 705, after injection molding is complete, the finished insulator is removed from the mold.

While the foregoing is directed to aspects and embodiments of the disclosure, other and further embodiments of the disclosure may be devised without departing from the basic scope thereof, and the scope thereof is determined by the claims that follow.

The invention claimed is:

1. An insulator for a gas-insulated device, comprising an injection-molded insulator disc and a conductor, wherein
    the insulator disc comprises a first circumferential surface, a second circumferential surface disposed radially outwards from the first circumferential surface, and a web portion connecting the first circumferential surface and the second circumferential surface,
    characterized in that the web portion comprises a wave structure, the web portion having an inner wave profile at the first circumferential surface and an outer wave profile at the second circumferential surface, wherein the inner wave profile and the outer wave profile each have a radius of curvature of 2 mm or more and 10,000 mm or less
    wherein the inner wave profile has a first number of cycles ($n^i$) and the outer wave profile has a second number of cycles ($n_o$) which is more than the first number of cycles ($n_i$).

2. The insulator according to claim 1, wherein the web portion has a circumferential radius of curvature of 2 mm or more and 10,000 mm or less.

3. The insulator according to claim 1, wherein the web portion has a substantially constant thickness in the direction perpendicular to an upper surface and/or a lower surface of the web portion, wherein substantially constant thickness comprises a thickness that remains within a +/−10% tolerance between a thickest portion of a web portion and a thinnest portion of the web portion.

4. The insulator according to claim 1, wherein the inner wave profile has a first amplitude ($A_i$) and the outer wave profile has a second amplitude ($A_o$) which is less than the first amplitude ($A_i$).

5. The insulator according to claim 1, wherein the second number of cycles ($n_o$) is an integer multiple of the first number of cycles ($n_i$).

6. The insulator according to claim 5, wherein each peak of the inner wave profile is radially aligned with a respective peak of the outer wave profile or a respective trough of the outer wave profile.

7. The insulator according to claim 1, wherein the insulator disc is directly injection molded on an outer surface of the conductor.

8. The insulator according to claim 1, wherein the web portion further comprises stiffeners connecting the first circumferential surface to the second circumferential surface.

9. The insulator according to claim 8, wherein a number of stiffeners is equal to double the first number of cycles ($n_i$).

10. The insulator according to claim 1, wherein the insulator disc comprises a thermoplastic comprising one of the group containing TPU, TPE, epoxy and PUR.

11. The insulator according to claim 1, wherein the insulator disc has at least one radiused edge between the web portion and the first circumferential surface and/or between the web portion and the second circumferential surface.

12. A gas-insulated switchgear configured for medium-voltage or high-voltage, comprising at least one insulator according to claim 1.

13. The gas-insulated switchgear according to claim 12 further configured for switching a medium voltage or a high voltage.

14. A method for the production of an insulator according to claim 1, said method comprising:
    providing a mold for injection molding of an insulator disc, the insulator disc comprising an inner portion having a central opening;
    arranging a conductor in a cavity of the mold;
    injecting a material into the mold to form the insulator disc such that the conductor is positioned inside the central opening and the inner portion and the conductor are directly or indirectly fastened together; and
    removing the insulator from the mold.

* * * * *